United States Patent
Grenda

(10) Patent No.: US 6,206,672 B1
(45) Date of Patent: Mar. 27, 2001

(54) APPARATUS OF FABRICATING 3 DIMENSIONAL OBJECTS BY MEANS OF ELECTROPHOTOGRAPHY, IONOGRAPHY OR A SIMILAR PROCESS

(75) Inventor: Edward P. Grenda, 43 Everett St., Arlington, MA (US) 02174

(73) Assignee: Edward P. Grenda, Arlington, MA (US)

(*) Notice: Subject to any disclaimer, the term of this patent is extended or adjusted under 35 U.S.C. 154(b) by 0 days.

(21) Appl. No.: 08/220,889

(22) Filed: Mar. 31, 1994

(51) Int. Cl.$^7$ .................................................. B29C 35/08
(52) U.S. Cl. ........................................ 425/174.4; 264/484
(58) Field of Search ................................ 425/174.4, 174; 264/22, 219, 308, 401, 482, 484; 427/595–597; 118/620, 621; 156/62.2, 272.8, 630; 346/153.1, 155, 159

(56) References Cited

U.S. PATENT DOCUMENTS

| | | | |
|---|---|---|---|
| 4,409,604 | * 10/1983 | Fotland | 346/159 |
| 4,804,980 | * 2/1989 | Snelling | 346/159 |
| 4,961,154 | * 10/1990 | Pomerantz et al. | 425/174.4 X |
| 5,038,159 | * 8/1991 | Schmidlin et al. | 346/155 X |
| 5,088,047 | * 2/1992 | Bynum | 425/174.4 X |
| 5,148,204 | * 9/1992 | Rezanka | 346/155 X |
| 5,153,618 | * 10/1992 | Frank et al. | 346/159 |
| 5,200,285 | * 4/1993 | Carrish | 346/155 X |

* cited by examiner

Primary Examiner—Richard L. Chiesa
(74) Attorney, Agent, or Firm—Choate, Hall & Stewart

(57) ABSTRACT

Freeform fabrication apparatus for rapid prototyping. In one embodiment, the apparatus includes ion-generating equipment for sequentially creating latent ion images of layers of an object to be fabricated. Developing apparatus is provided for adhering at least one object building substance to the sequential latent ion images to create a series of laminae. Thereafter, the series of laminae are assembled to fabricate the object.

12 Claims, 6 Drawing Sheets

APPARATUS OF FABRICATING 3 DIMENSIONAL OBJECTS BY MEANS OF ELECTROPHOTOGRAPHY, IONOGRAPHY OR A SIMILAR PROCESS

BACKGROUND OF THE INVENTION

Numerous systems for the freeform fabrication of three dimensional objects under computer control have been proposed. This field has become known by the general terms "rapid prototyping" and "desktop manufacturing" over the last several years.

While existing or proposed three dimensional freeform fabrication systems differ from each other in the materials used to build objects in the specific process, the form or state of these materials, and the particulars of the mechanics to form objects and the properties of the resulting objects themselves, almost all of the methods are based upon the layerwise superposition and bonding of materials to form the object. The numerical information required to control a freeform fabrication apparatus and thus to form and bond together each such layer of an object is commonly obtained by performing additional mathematical processing upon the data file which defines the desired object from a three dimensional computer aided design (CAD) system. These additional mathematical steps define the layers of the object as required to perform a freeform fabrication process. It is also possible to use as a starting point a physical object, digitize the spatial coordinates of the object and in a similar fashion perform additional mathematical processing on this data to define layers of the object for a freeform fabrication process. Thus, a second object can be generated that may be different in scale, materials or design from the first.

The uses for three dimensional freeform fabrication systems include, but are not limited to: the rapid fabrication of prototype parts for use as engineering or design models, both for functional and visual design verification; the rapid fabrication of investment and other types of casting patterns; fabrication of unique objects to be used as casting patterns or even functional objects, as for example from CAT scan or NMR data for prosthetic and other medical uses; the fabrication of objects of geometries that would be difficult or impossible to realize using typical subtractive machining processes such as milling or turning on a lathe.

Such systems in addition possess the virtue of allowing rapid realization of a three dimensional object from data supplied by a computer aided design (CAD) system without the preparation of intervening tooling and thereby lower the time for the overall design cycle in many cases from months to a few days or hours. This results in great savings in tooling costs, especially in cases where several iterations may be required to be performed until an acceptable final design or tool is realized, and also results in a highly-desirable, more timely introduction of the so-designed products to market.

Among the processes that have been proposed are those which use layerwise hardening of a photopolymer as the object medium such as stereolithography, U.S. Pat. No. 4,575,330, solid ground curing, U.S. Pat. No. 4,961,154, and design controlled automatic fabrication, U.S. Pat. No. 4,752, 498, and others. Another group of proposed technologies is based on layerwise material deposition and includes ballistic particle manufacturing, U.S. Pat. No. 4,665,492, fused deposition modeling, U.S. Pat. No. 5,121,329, inkjet methods, U.S. Pat. No. 5,059,266, weld metal deposition, U.S. Pat. No. 5,207,371, masked plasma spray, U.S. Pat. No. 5,126, 529, and others. The object materials in these techniques include melt extruded plastics and waxes, photopolymers, ballistically jetted waxes and metals, and other materials. Still other methods have been proposed based upon the bonding of powders. Selective laser sintering, U.S. Pat. No. 4,863,538, uses the energy of a laser to layerwise bond particles of plastic, wax, or metal together until the desired object is formed. Three dimensional printing, U.S. Pat. No. 5,204,055, is similar, but replaces the laser with a high speed inkjet system which ejects bonding material layerwise into a bed of ceramic powder. The object so formed may subsequently be sintered and may be used to produce a metal article by means of an investment casting-like process without the requirement for an intervening wax or other material pattern.

Additional three dimensional freeform fabrication methods are based on the cutting out of cross sections of the desired object from sheet or web fed material and subsequent lamination of these cross sections to form the object. The most commercially successful of these techniques to date is laminated object manufacturing, U.S. Pat. No. 4,752, 352. Paper, plastic films of various kinds and metal foils may be used in this process to form the desired object.

While there are, as described above, many proposed methods for three dimensional freeform fabrication, and indeed some of these have reached a significant level of commercialization, there are many disadvantages to the existing and proposed methods. Examination of these methods and their characteristics, advantages and disadvantages, permits the desirable properties of an improved freeform three dimensional object fabrication method to be listed:

a. It is desirable that an improved method of freeform fabrication be a slice-based technology. This allows the rate of construction of the object to be independent of the geometry of the object and shortens fabrication time by eliminating the need for calculating and individually positioning vectors as is required for stereolithography or fused deposition modeling. It would be a further advantage if the layers did not require the fabrication of an intervening mask as required by solid ground curing or design controlled automatic fabrication.

b. A solid support material is desirable in an improved method of freeform fabrication in order to produce desired objects with the most generalized geometric capability, to minimize built in stress and to improve accuracy by preventing wandering and swelling of the fabricated object as occurs with some methods that use liquid photopolymers. A solid support also dispenses with the need to design a support structure for overhanging or other geometrically awkward volumes of the desired object as is required in stereolithography or fused deposition modeling.

c. It is desirable in an improved method of freeform fabrication that the support material be subjected to the same physical processes as the build or object material in order to result in minimum differences in physical properties between the support and the object materials. The reasons are similar to those set forth above. Note that in the case of selective laser sintering, while a solid support structure is provided by the powder which remains unsintered, the difference in density between this unsintered support and the sintered object powders can lead to inaccuracies in object geometry.

d. An improved method of freeform fabrication should be capable of providing high resolution and accuracy. High resolution will result in better surface finish.

e. High speed operation should be possible with an improved method of freeform fabrication. It is very desirable to be able to build objects much more quickly than previously known methods are capable.

f. Object materials used in an improved method of freeform fabrication should be safe, non-toxic and inexpensive. Unlike the situation with some existing methods, it is highly desirable to be able to build objects in materials which are suitable for the actual application envisioned for the object. It is further desirable that there results no emission of smoke or vapors requiring venting as with some methods such as laminated object manufacturing which uses a carbon dioxide laser for material cutting. Many photopolymers used in present methods can irritate the skin or respiratory tract and are suspected carcinogens. It is thus desirable to avoid the use of these materials.

g. An improved method of freeform fabrication should utilize existing technology and not require expensive or exotic components. Many present methods such as stereolithography require expensive and/or limited-life lasers, expensive laser beam positioning and modulating means or other costly components. The use of less expensive components will result in lower prices for the equipment and wider adoption.

h. An improved method of freeform fabrication should evolve from technology with a record of reliability.

i. The post-processing operations of an improved method of freeform fabrication, if any, should be clean and simple. Some present methods such as stereolithography require post-curing of fabricated objects in an oven or UV light box after removal of excess material by solvent-bathing and manual wiping. Other methods offer much easier post-processing such as a warm water rinsing, or brushing off of excess powder, and there are some methods where no post-processing is required at all. These cleaner techniques of post processing are highly desirable.

j. An improved method of freeform fabrication should be adaptable to many market segments: for example, low-cost, high-speed, multi-material, etc. The cost of components in many technologies, precludes low-cost versions of such equipment from being developed, and the nature of many of the processes is such that they may not be adaptable to a wide array of such markets.

k. The size and other mechanical characteristics of the machinery used in an improved method of freeform fabrication should be appropriate for an office or laboratory environment. Some present systems such as solid ground curing weigh several tons and occupy a complete room.

Thus, it can be seen that in spite of the existence of numerous proposed and current methods for the fabrication of freeform three dimensional objects, there still exists a need for a method which combines the desirable characteristics described above.

U.S. Pat. No. 5,088,047 teaches a prior art method of freeform fabrication based on electrophotography that answers the requirements described above. See, for example, Schein, L. B., "Electrophotography and Development Physics," Springer-Verlag, Berlin 1988, for a general review of the field. In this patent, a powder image representing a thin laminar cross section of a desired object is formed on a conductive drum having its exterior surface coated with a photoconductor in the usual manner of electrophotography. A uniform charge is placed on the drum by a corona or other discharge element and this charge is subsequently dissipated imagewise by an exposure element. The exposure element according to this patent may be any of several known optical devices including, but not limited to, a scanned laser, light emitting diode arrays and liquid crystal gated linear light sources. The latent image so formed corresponds to a single cross section of a desired object.

This latent image subsequently rotates through one or more developing stations where various object building substances in powder form are deposited by electrostatic attraction to the latent image on the drum. The drum rotates in synchronism with and in close proximity to or in contact with a dielectric transfer belt. Charge of a correct sign and magnitude deposited on the belt by a second corona or other discharge element electrostatically attracts the deposited object building powders imagewise to the belt. Subsequently, the lamina are moved to a build area where the object is assembled from the series of lamina.

While all the desirable criteria listed above are met by the prior art there still exist several shortcomings when the prior art is used for three dimensional freeform fabrication:

First, owing to the photoconductive nature of the processes involved in electrophotography, all machine operations must be conducted in the dark and a machine which utilizes this process must be made light-tight. In addition to the expense of providing the additional machine elements to accomplish this end, it is highly desirable that the progression of the fabrication of objects be viewable by an operator. Since in many cases such an apparatus will be constructing never before made objects, it is desirable to be able to continuously monitor the progress and to be able to stop or modify operation in the event of error.

Second, the development of object building powders to be used in an electrophotographically based three dimensional freeform fabrication process is complicated by the requirements for simultaneous compatibility of a wide range of properties for each such material: Object building powders must be compatible for use with the chosen photoconductor material, and must simultaneously possess compatible and desirable dielectric, thermal, chemical, fusing and mechanical properties. A means that decreases the number of properties that must be required simultaneously of object building powders is highly desirable and will result in both a greater number and range of useful materials, and in fewer restrictions on each material thus used.

Third, a method of three dimensional freeform fabrication which is based upon electrophotography is capable of making very thin object layers and providing very high resolution along the thickness or object building axis. Indeed, electrophotographic processes inherently produce thin layers. In a freeform object fabrication application, this results in the requirement for a very large number of machine operations. For example, a 10 inch high object made from 0.00033 inch thick layers results in a total of 30,000 layers. Photoconductors experience both mechanical wear as well as degradation in charge trapping characteristics with such prolonged use and thus a method which provides a large number of cycles of operation of the latent imaging member is highly desirable.

While there are available photoconductors such as amorphous silicon that are guaranteed by manufacturers for 500,000 operations, and have been tested to 1,000,000, this latter figure would only represent 330 height inches of object using the example above. This result can also be thought of as only 33 ten inch high objects. Use of such photoconductors may also require significant additional limitations on object building powders. For example, Kyocera Corp. of Japan has recently introduced the use of amorphous silicon photoconductors on a commercial basis in low cost laser printers. The toner used with this latent imaging member requires the addition of abrasive particles to keep the photoconductive drum polished and thereby achieve a long service life.

While techniques known in the art as have been applied to high volume copiers and printers may be utilized to increase the available number of electrophotographic operations, such means result in added mechanical complexity and cost. As an example, a photoconductive belt may be mounted inside a purely mechanical drum whose external surface is covered by the belt, which, as it is unwound exposes a fresh photoconductive surface. See Schein, supra.

Thus it can be seen that a method of three dimensional freeform fabrication which allows for a larger number of operations without significant degradation of the latent imaging member will result in fewer requirements for the object building powders, mechanical simplification, and lower costs.

SUMMARY OF THE INVENTION

The freeform fabrication apparatus according to the present invention includes ion generating apparatus for sequentially creating latent ion images of layers of an object to be fabricated. Developing apparatus is provided for adhering at least one object building substance to the sequential latent ion images to create a series of laminae. Thereafter, apparatus is provided for assembling the series of laminae to fabricate the object. In a preferred embodiment, e is placed on a thin dielectric coating on a conductive drum. Charge is placed on the drum imagewise by a linear array of controlled ion discharge elements. In this embodiment, the drum bearing the latent image rotates through one or more developing stations where various object-building substances in powder form are deposited by electrostatic action to the latent image on the drum. The now developed image is transferred to a transfer belt after which the developed image is made tacky by application of heat, solvent, radiation, or other techniques known in the art. Subsequently, the tackified lamina is moved by the transfer belt to a build area. In this embodiment, solenoids apply pressure to the lamina on the belt against a back-up plate fixedly positioned at the rear of the belt resulting in transferral of the lamina to either the surface of a platen or to the top of a stack of previously deposited cross sections of the object to be fabricated.

In yet another embodiment of the invention at least two image-forming elements are provided for forming separate portions of a latent image. Different object-building powders are then used by the separate image-forming devices for creating a developed image. In a further embodiment of the invention, apparatus is provided for sequentially electrostatically propelling particles of an object-building substance toward a support to create sequential particle images on the support of layers of an object to be fabricated and thereafter the sequential particle images are assembled to fabricate the object.

The ionography aspect of the invention meets all of the desirable features listed above and overcomes the limitations of prior art devices using electrophotography. In particular, the present invention can be operated in sufficient light so that its operation may be observed by an operator. Further, the elimination of a photoconductive drum decreases the number of properties simultaneously required of object-building powders. Finally, the present invention permits a large number of latent imaging operations without significant degradation of the latent imaging member.

DESCRIPTION OF THE PREFERRED EMBODIMENT

Figure 1:
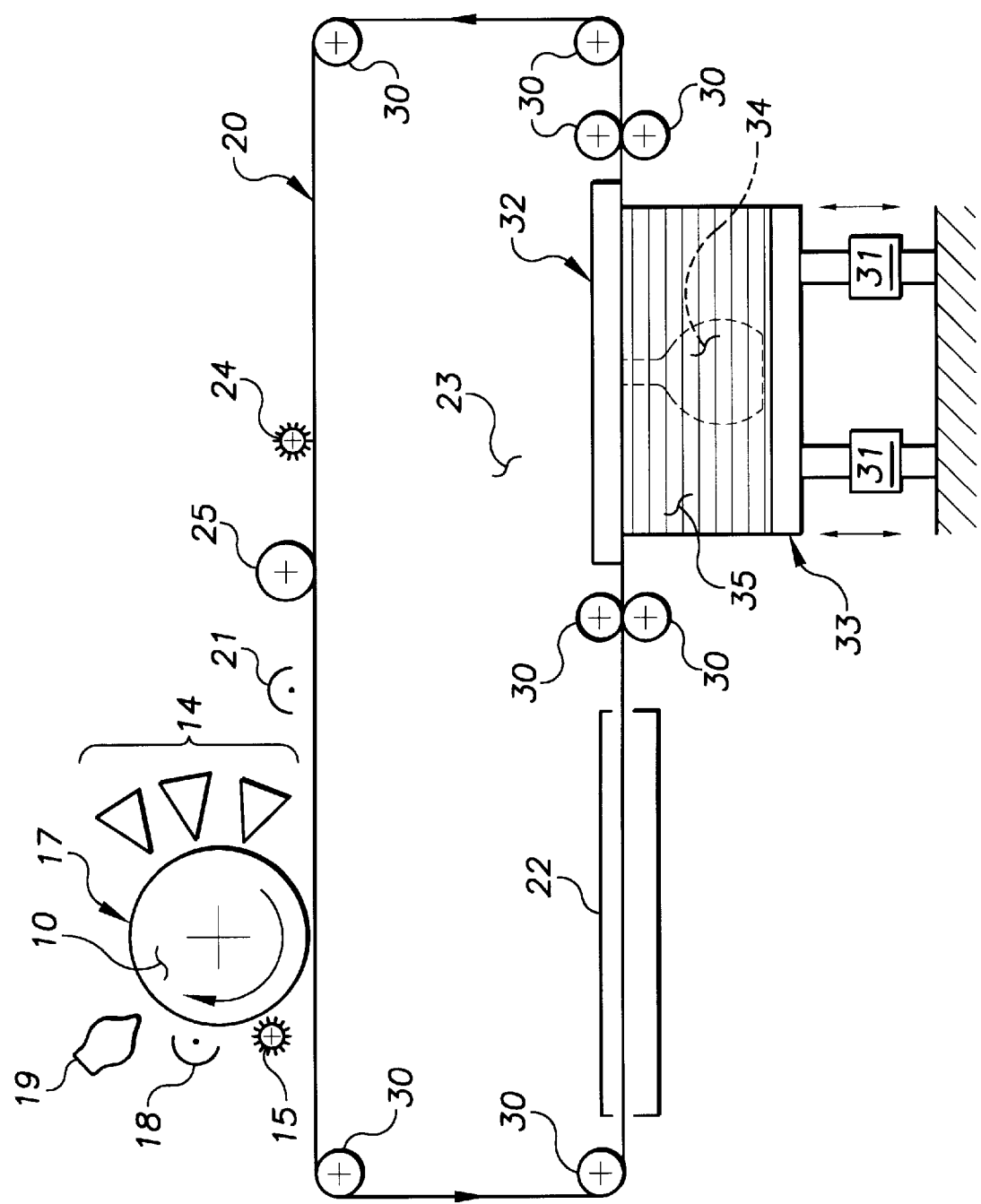
FIG. 1 is a cross-sectional view of one embodiment of the apparatus of the present invention.

With reference to FIG. 1, a powder image representing a thin laminar cross section of a desired object is formed on a conductive drum 10 having its exterior surface coated with a thin dielectric 17 in the usual manner of ionography. See Schein, supra. A charge is placed on the drum imagewise by a linear array of controlled ion discharge elements 19, or other techniques known in the ionographic arts, U.S. Pat. No. 4,409,604. These techniques include, but are not limited to Corjets, U.S. Pat. No. 5,153,618, synchronized motion aperture devices, U.S. Pat. No. 4,839,670, and laser addressed ionographic devices, U.S. Pat. No. 4,804,980. The latent image so formed corresponds to a single cross section of a desired object.

This latent image subsequently rotates through one or more developing stations 14 where various object building substances in powder form (not shown) are deposited by electrostatic attraction to the latent image on the drum 10. The powder object building substances may differ from one another in various properties, including but not limited to coloration, differential solubility, etc. As an example, if the powders possess differential solubility, this property would allow one material to be used to create the desired object and the second to form a supporting matrix for this object which can easily be separated from it in a secondary operation by exposure, for example, to a suitable solvent. In this case, the support material is deposited by the corresponding developing element in the areas of the cross-sectional lamina, both surrounding and not otherwise occupied by the cross-section of the object itself.

The drum 10 rotates in synchronism with and in close proximity to or in contact with a dielectric transfer belt 20. This belt may be supported by rollers 30 and may be made of a thermally resistant substance such as Teflon®. Charge of a correct sign and magnitude deposited on the belt by a corona or other discharge element 21 electrostatically attracts the deposited object building powders imagewise to the belt. After transfer of the object building powders to the belt 20 from the drum 10, the surface of the drum 10 rotates past a cleaning brush or other cleaning device 15 and is fully discharged by an AC corotron 18 or other device in preparation to repeat the ionographic drum cycle.

The powder cross-sectional lamina transferred to the belt 20 which may be a composite lamina made of one or more substances as described above, is moved by the belt into a station 22 where it is made tacky by application of heat, solvent, radiation or other techniques known in the art. Subsequently the tackified lamina is moved by the belt to a build area 23. Solenoids 31 apply pressure to the lamina on the belt against a backup plate 32 fixedly positioned at the rear of the belt 20, resulting in transferral of the lamina to either the surface of a platen 33, if the lamina represents the first cross section of the object, or to the top of the stack of previously deposited cross sections if it is the second or greater cross section of the object. The object under construction 34 is shown in FIG. 1 by the dashed lines generally located within a matrix of another material 35 which may possess, for example, differential solubility as previously mentioned.

The belt subsequently moves past a cleaning brush or other cleaning element 24 and a conductive discharge roller or similar element 25 in preparation to repeat the transfer belt 20 cycle.

The method described in FIG. 1 is based upon geometric slices of the object rather than requiring the calculation and use of vectors. It has the capability to use solid support material which is subjected to the same physical processes as the object building substance itself. High resolution and rapid operation are possible as are known in the art of ionography and it is adaptable to use with a wide range of safe materials. No fumes or smoke are generated and with proper choice of materials, post-processing operations are straightforward. Ionography is a well-known, reliable technology requiring no exotic or expensive components. The size and mechanical characteristics of an ionographic apparatus are appropriate for either an office or laboratory environment.

In addition, because photoconductors are not utilized in most forms of ionography, it is possible to operate the apparatus in the light thus allowing its operation to be observed visually and avoiding the added costs associated with making such an apparatus light-tight.

Further, materials used with an ionographic process need not be compatible with a photoconductor and thereby the tasks of material selection and development are eased.

Yet further, ionographic processes are known in the art to possess the ability to provide very large numbers of latent imaging cycles. The thin, relatively mechanically delicate photoconductor used in the electrophotography of the prior art is replaced with a generally thicker and mechanically more durable dielectric layer. The additional degradation in charge trapping that photoconductors experience with use is also avoided.

Figure 2:
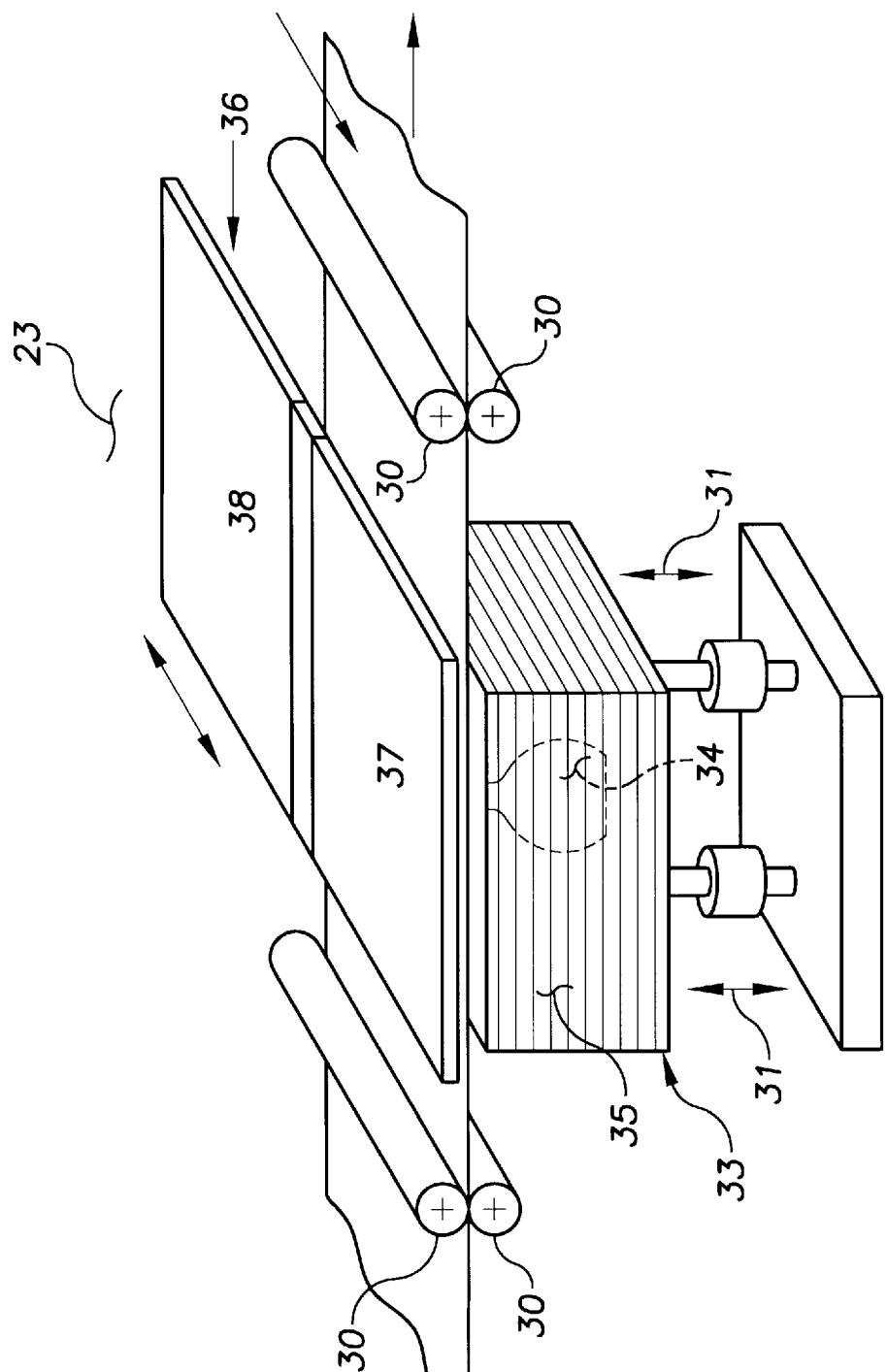
FIG. 2 is a perspective view of a portion of the apparatus of the embodiment of FIG. 1.

It will be obvious to those practiced in the art that many modifications to the method and apparatus described in FIG. 1 may be made without departure from the spirit and the scope of the invention. For example the imaging member 10 may take forms other than a drum such as a belt or a plate. Other modifications may include fusing or otherwise tackifying and bonding the powder laminae of the object directly to previous formed layers of the object within the build area 23 itself as shown in FIG. 2. As shown in this figure, apparatus may be provided to more rapidly cool and thus harden and bond each layer as it is formed.

The fusing and cooling platen 36 moves perpendicularly to the direction of travel of the transfer belt 20 and in contact with its driven surface, to first fuse then rapidly solidify each layer of the object 34. One end 37 of this platen 36 is heated and the other end 38 is thermally isolated from this heated portion and is provided with cooling apparatus to lower its temperature. The powder laminae 35 are positioned by the transfer belt 20 above the platen 33 or the previously formed layers of the object 34 within the build areas 23. The solenoids 31 apply pressure to the lamina 35, first against the heated end of the platen 37 to fuse the powder object building material. The solenoids 31 maintain pressure while the platen 36 is moved to the cooling position with end 38 positioned above the stacked layers of the object under construction. After the lamina is hardened, the solenoids 31 release the pressure, the transfer belt 20 moves the next lamina into position and the cycle is repeated.

Figure 3:
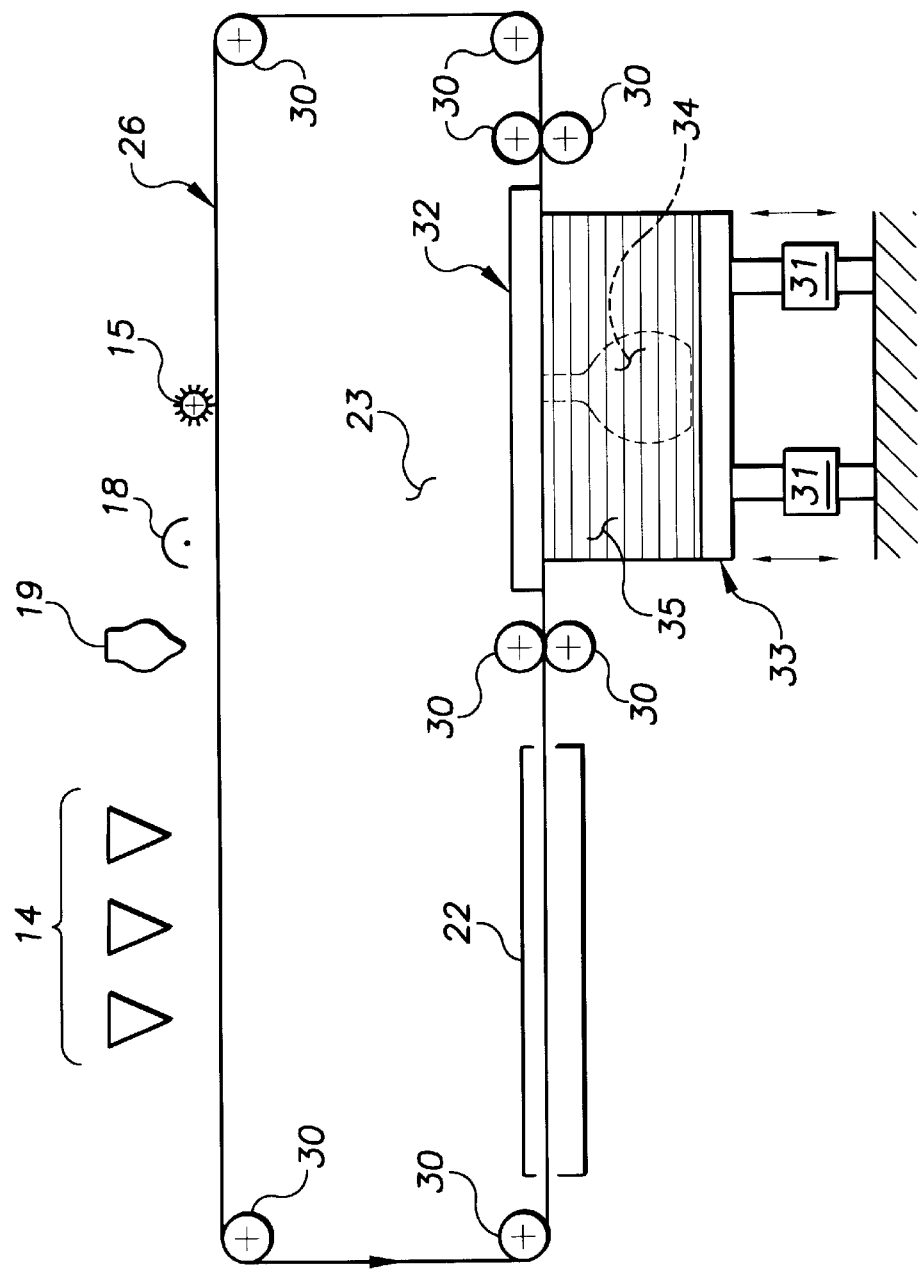
FIG. 3 is a cross-sectional view of another embodiment of the present invention.

Yet other modifications to the method and apparatus are shown in FIG. 3 wherein an ionographic imaging member such as the linear array of ion discharge elements 19, or other ion projection elements described above, forms a latent charge image directly on a transfer belt 26, thus combining the functions of imaging and transfer and reducing the number of required parts.

As shown in FIG. 3, the belt 26 is formed of a thin conductive base layer generally in contact with the drive rollers 30 and a dielectric upper layer. The dielectric surface of the belt passes beneath the ion imaging member 19 where a latent charge image is formed. The belt then travels past developing stations 14 where object building powders are attracted to the latent image electrostatically to form a powder lamina of the object. The belt subsequently passes through a station where the powder lamina is made tacky by any various means as aforesaid 22 and thence to a building area 23 where the lamina is bonded to the previously formed layers of the object under construction as also previously described in FIGS. 1 and 2. As final steps, the belt 26 travels past a cleaning brush or other cleaning element 15 and is fully discharged by the AC corotron or other neutralizing element 18 and the cycle is repeated. Of course, it will be obvious to those practiced in the art that variations from this description may be made not departing from the scope and spirit of the invention.

Figure 4:
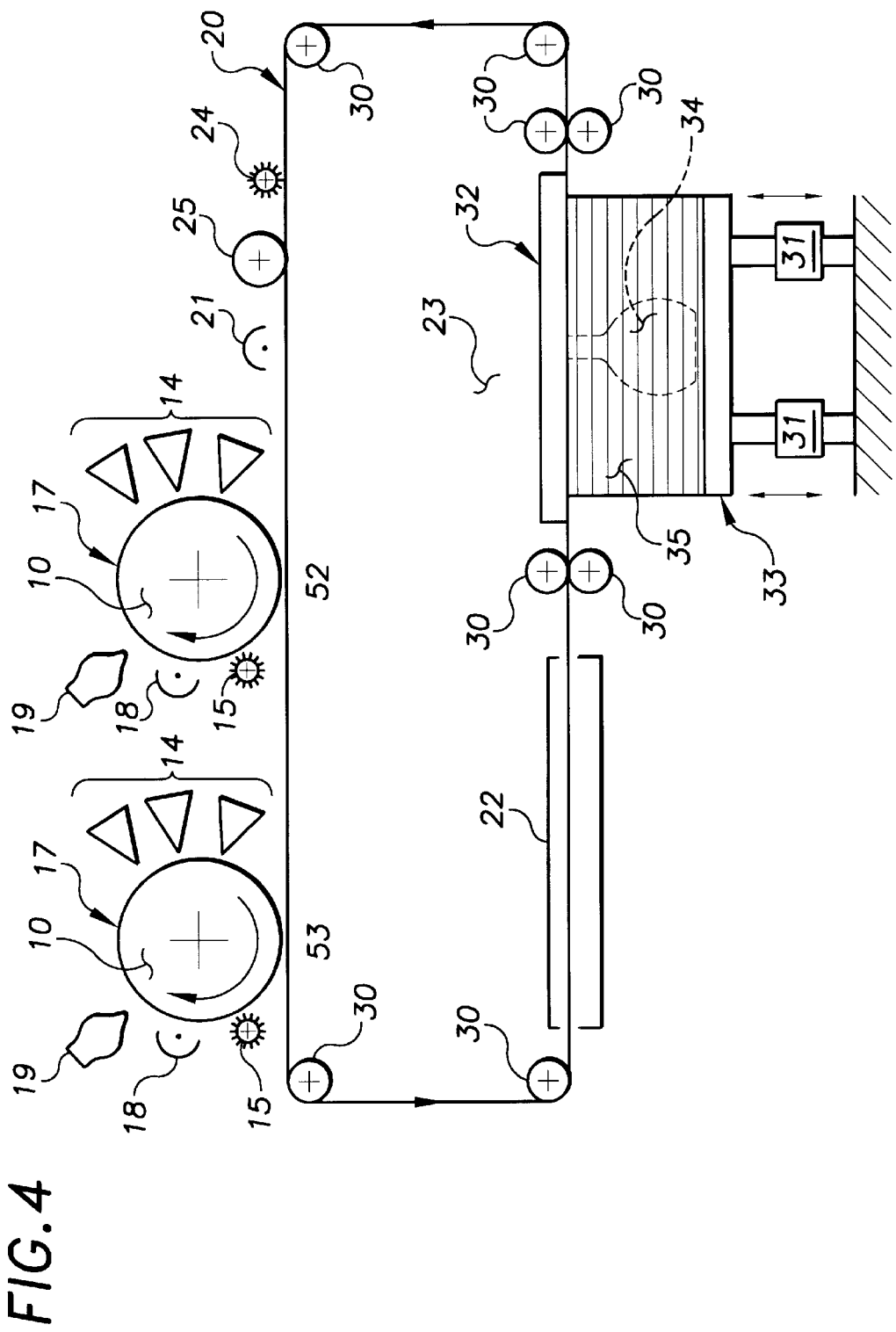
FIG. 4 is a cross-sectional view of an embodiment of the invention utilizing at least two image-forming elements.

FIG. 4 shows still another form of the method and apparatus wherein a separate electrophotographic or ionographic imaging member and related components are used with each object building powder. This configuration offers the additional advantage of optimization of the choice of photoconductor in the case of electrophotography or ionographic imaging dielectric for each corresponding object building powder, and thus also further simplifies the problem of material property compatibility. In FIG. 4 a configuration with ionography is shown, but the same advantages are conferred on electrophotography, as well.

If a single electrophotographic or ionographic cycle is utilized to form a powder object lamina of two or more materials, provision must be made to provide two or more levels of charge in the latent image, or a latent image having bi-polar charge, or other means, so that object building powders will only be developed on the drum 10 in the specific areas where they are desired. This result can be most easily accomplished for the case of two materials and examples from the field of multi-color printing using electrophotographic or ionographic means are instructive by analogy: When ionography is used, a bi-polar latent charge image may be formed on the drum and toners may be utilized that are only attracted to a single charge polarity. When electrophotography is used an intermediate voltage may be chosen as a reference value for the latent charge image and toners are utilized that are attracted exclusively to charges either higher or lower than this level. While these and other methods are known in the art, U.S. Pat. Nos. 5,200,285; 5,121,172; 5,204,697, a significant burden is thus placed on the toner material requirements in the case of printing, but more especially on powder materials to be used for object building in a freeform fabrication method since many additional requirements as previously indicated also exist. Also, as the number of object building powders increases beyond two, the requirements become more stringent yet.

If multiple electrophotographic or ionographic cycles are utilized to form an object lamina of two or more materials, much of the burden is removed from the simultaneous property requirements of the object building powders. Each material may operate using the same or a similar level of voltage for the latent image charge, for example. However, in this case the transfer belt 20 must be reversed in direction, or cycled completely around its loop, for each individual electrophotographic or ionographic cycle. This complicates control somewhat, but more particularly because of the multiple operations provides opportunity for misregistration among the different material portions of the composite laminae and slows the operation of the apparatus.

Operation of the apparatus in FIG. 4 is similar to that described for FIG. 1, except in this case two, or more, electrophotographic or ionographic latent imaging and developing systems are utilized. In this figure, only two such systems 50 and 51 are shown for clarity, but any number may be utilized depending on the particular requirements. Also, while an ionographic drum based system is shown for illustrative purpose, it's clear that either electrophotography and/or other machine elements may be utilized. The first latent imaging and developing system 51 transfers a powder lamina of a first object building material to the transfer belt at location 52 as the belt passes this location with motion synchronous to that of the ionographic drum. The second electrophotographic or ionographic system 50 transfers a corresponding powder lamina to the same area of the transfer belt 20 as it carries the first deposited powder lamina past location 53. Thus a lamina consisting of two or more object building powders may be formed on the transfer belt. As an example, and as aforesaid, the object building powders thus deposited may be of different colors, or may possess differential solubility, so that the second may act as a support material for the first in the construction of the desired object, or they may possess other properties different from one another. It is further obvious to those practiced in the art that modifications may be made to this variation of the first embodiment, some of which have been previously described, without departure from the spirit and scope of the invention.

Figure 5:
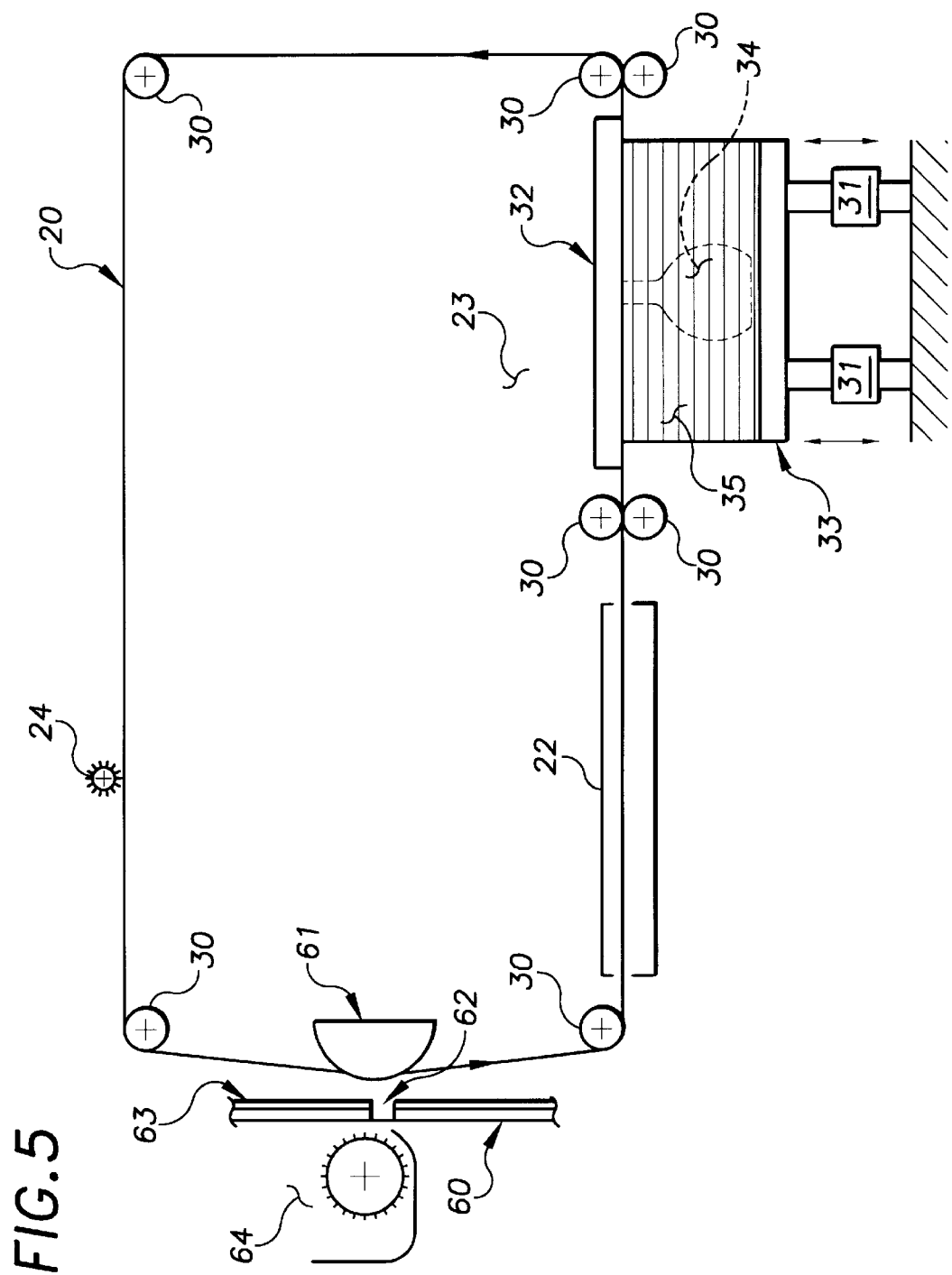
FIG. 5 is a cross-sectional view of an embodiment of the invention utilizing direct electrostatic transfer.

FIG. 5 shows another embodiment of the invention. This embodiment of the invention utilizes direct electrostatic transfer of object building powders to a transfer belt as taught by U.S. Pat. No. 5,038,159 and others. In the figure the dielectric transfer belt 20 having similar mechanical and thermal properties to that used in FIG. 1 passes in close proximity to a thin aperture plate 60 while held taught against a conductive backing shoe 61. These elements are shown in cross section and greatly enlarged for clarity. The numerous small apertures in the aperture plate extend over the width of the belt 20 and are arranged in a pattern to provide full coverage to it. Each aperture is surrounded by a control electrode 63 and in some implementations a shield electrode (not shown). An object building powder is presented in close proximity to the rear of the aperture plate by means such as rollers, brushes, an electrostatically generated wave of the object building powder itself, U.S. Pat. No. 4,949,103, or any of various other techniques known in the art 64. The application of appropriate voltage signals to the control electrodes and conductive backing electrodes causes particles of object building powder to be propelled electrostatically through the apertures imagewise to form a powder lamina of the desired object on the transfer belt 20. The subsequent steps of tackification, bonding and cleaning of the transfer belt may be carried out as described above for FIG. 1.

It will be obvious to those practiced in the art that variations may be made in this description without departing from the spirit and scope of the invention, several of which have previously been described for the first embodiment. As further examples, more than one direct electrostatic transfer mechanism and additional object building powders may be utilized to form composite laminae as previously described. In addition, instead of electrostatically propelling the object building powders directly to the transfer belt, a conductive dielectrically coated drum, or other powder lamina retaining element, and a subsequent transfer of the powder laminae to a belt or other transfer member may be utilized. Yet in further addition, apertureless direct electrostatic transfer, U.S. Pat. No. 5,148,204, of object building powders, or other means of direct electrostatic transfer of powder particles known in the art may be utilized.

Figure 6:
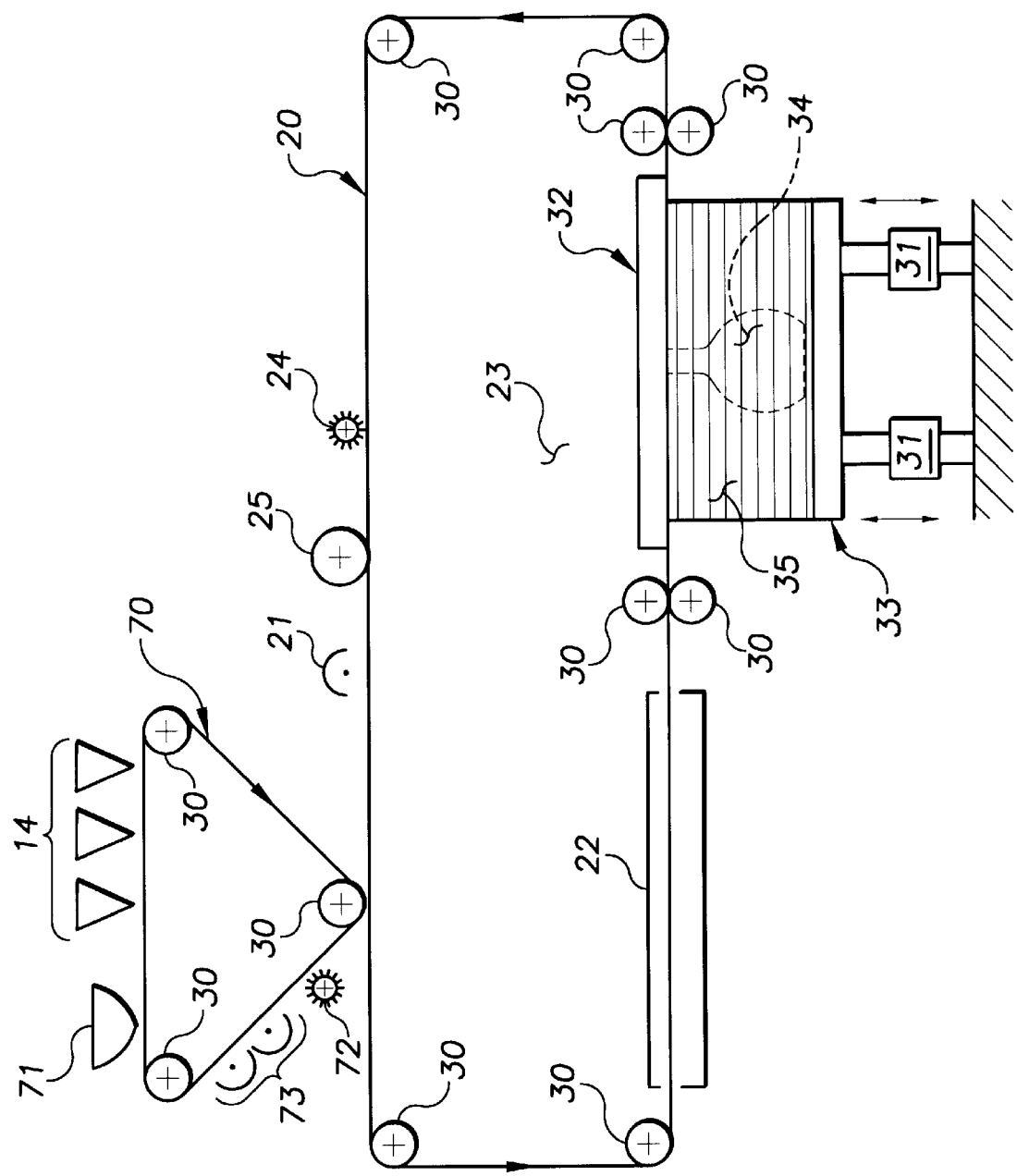
FIG. 6 is a cross-section view of an embodiment of the invention utilizing electrographic charge deposition.

FIG. 6 shows yet another embodiment of the invention. This embodiment of the invention utilizes electrographic charge deposition to an intermediary belt as taught by U.S. Pat. Nos. 4,638,339; 4,264,912 and others. As shown in FIG. 6, electrostatic charges are placed imagewise on an intermediary belt 70 supported by rollers 30, by an array of conductive electrodes 71 in close proximity to the belt. The electrodes extend over the width of the belt and are arranged in a pattern to provide full coverage to it. The belt 70 is preferably formed of a dielectric upper layer proximate to the electrodes 71 and a conductive layer below in contact with the driver rollers 30 although entirely dielectric constructions are also known in the art. The spacing between the electrodes and dielectric layer of the belt is maintained at the Paschen spacing and control voltages impressed on the electrodes cause ions to be propelled imagewise to the belt by means of the Paschen Effect. The latent charge image so formed corresponds to a single cross section of a desired object.

This latent image on the intermediary belt 70 subsequently is moved through one or more developing stations 14 where various object building substances in powder form are deposited by electrostatic attraction to it. The powder object building substances may differ from one another in various properties as previously described.

The belt travels in synchronism with and in close proximity to or in contact with a dielectric transfer belt 20. This belt may be supported by rollers 30 and may be made of a thermally resistant substance such as Teflon®. Charge of a correct sign and magnitude deposited on the transfer belt 20 by a corona or other discharge element 21 electrostatically attracts the deposited object building powders imagewise from the intermediary belt 70 to the transfer belt 20. After transfer of the object building powder lamina to the transfer belt from the intermediary belt, the intermediary belt travels past a cleaning brush or other cleaning element 72 and the latent charge image is erased and the surface of the belt and preconditioned by AC and DC corona discharge or other techniques known in the art 73 in preparation to repeat the intermediary belt cycle.

The subsequent steps of tackification and bonding of the powder laminae may be carried out as described above for FIG. 1.

The transfer belt 20 subsequently moves past a cleaning brush or other cleaning means 24 and is discharged by the conductive roller, or similar device 25 in preparation to repeat the transfer belt cycle.

It will be obvious to those practiced in the art that variations may be made in this description without departing from the spirit and scope of the invention, several of which have previously been described for the other embodiments. As further examples, more than one electrographic charge deposition mechanism and additional object building powders may be utilized to form composite laminae as previously described. In addition, instead of utilizing separate intermediary and transfer belts, tackification and transfer of the powder laminae to the object under construction may be accomplished using the intermediary belt exclusively in an analogous fashion to FIG. 3.

What is claimed is:

1. Freeform fabrication apparatus comprising:
   ion generating apparatus for sequentially creating latent ion images of layers of an object to be fabricated;
   developing apparatus for adhering at least one object building substance to the sequential latent ion images to create a series of laminae; and
   apparatus for assembling the series of laminae to fabricate the object.

2. The apparatus of claim 1 wherein the latent image is created on a conductive drum coated with a dielectric layer.

3. The apparatus of claim 1 wherein the ion generating apparatus is a linear array of controlled ion discharge elements.

4. The apparatus of claim 1 wherein the object building substance is a powder.

5. The apparatus of claim 1 further including means for making the object building substances tacky.

6. The apparatus of claim 1 wherein the apparatus for assembling the series of lamina comprises:
   a platen; and
   actuators for moving the platen into contact with the lamina.

7. The apparatus of the claim 6 wherein the actuators are solenoids.

8. The apparatus of claim 1 further including a movable plate including heated and cooled portions alternately placed into thermal contact with a lamina.

9. Freeform fabrication apparatus comprising:
   a first latent image forming apparatus for forming a first portion of a latent image of a layer of an object to be fabricated;
   a first development apparatus for adhering a first object building substance to the first portion of the latent image;
   at least a second image-forming-apparatus for forming a second portion of the latent image of the layer of the object to be fabricated;
   a second developing apparatus for adhering a second object building substance to the second portion of the latent image; and
   apparatus for assembling the first and second object building substances to create the layer.

10. The apparatus from claim 9 wherein one of the image-forming apparatuses employs electrophotography.

11. The apparatus of claim 9 wherein at least one of the image-forming apparatuses is an ion generating apparatus.

12. Freeform fabrication apparatus comprising:
   apparatus for sequentially electrostatically propelling particles of an object building substance toward a support to create sequential particle images on the support of layers of an object to be fabricated; and
   apparatus for assembling the sequential particle images to fabricate the object.

* * * * *